United States Patent

Armand et al.

[11] Patent Number: 5,350,646
[45] Date of Patent: Sep. 27, 1994

[54] IONICALLY CONDUCTIVE POLYMERIC MATERIALS

[75] Inventors: Michel Armand, Saint-Martin-D'Uriage; Jean-Yves Sanchez, Saint Ismier; Daniel Deroo, Grenoble, all of France

[73] Assignees: Centre National de la Recherche Scientifique, Paris, France; Hydro-Quebec, Montreal, Canada

[21] Appl. No.: 945,639

[22] PCT Filed: Mar. 4, 1992

[86] PCT No.: PCT/FR92/00198

§ 371 Date: Nov. 6, 1992

§ 102(e) Date: Nov. 6, 1992

[87] PCT Pub. No.: WO92/16028

PCT Pub. Date: Sep. 17, 1992

[30] Foreign Application Priority Data

Mar. 7, 1991 [FR] France ............... 91 02715

[51] Int. Cl.$^5$ ........................................ H01M 10/40
[52] U.S. Cl. .................... 429/192; 429/198; 359/270
[58] Field of Search ............. 429/192, 198; 359/270

[56] References Cited

U.S. PATENT DOCUMENTS 4,293,623  10/1981  Klemann et al. ............ 429/198 X
4,908,284  3/1990  Hooper et al. .................. 429/192
4,925,752  5/1990  Fauteux et al. .............. 429/192 X

FOREIGN PATENT DOCUMENTS 0095982  12/1983  European Pat. Off. .

OTHER PUBLICATIONS

Chemical Abstracts, vol. 74, 1971, A. I. Falicheva, et al., "Cathode Polarization In Sulfate Electrolytes Of Various Modification Compositions", p. 418 (month unavailable).

Primary Examiner—Stephen Kalafut
Attorney, Agent, or Firm—Oblon, Spivak, McClelland, Maier & Neustadt

[57] ABSTRACT

The present invention relates to ionically conductive polymeric materials, to their preparation and to their use as a solid electrolyte. The materials comprise a solid solution of one or more salts in a polymer and are characterized in that the transport and the mobility of a metal cation $M^{n+}$ which has the valency n, $1 \leq n \leq 5$, are provided by at least one complex anion, corresponding to the general formula $[MZ_nY_p]^{p-}$ formed between an anionic ligand $Z^-$, an anionic ligand $Y^-$ and the cation $M^{n+}$, with $1 \leq p \leq 3$. Application to the formation of electrochemical generators and of electrochemical systems which make it possible to affect the transmission of light.

20 Claims, 1 Drawing Sheet

IONICALLY CONDUCTIVE POLYMERIC MATERIALS

BACKGROUND OF THE INVENTION

1. Field of the Invention

The present invention relates to ionically conductive polymeric materials, to their preparation and to their use as a solid electrolyte.

2. Discussion of the Background

Metal salts $MX_n$, in which M denotes a metal cation and X denotes a monovalent anion, form complexes with some solvating polymers, in particular those incorporating sequences of polyether type (for example poly(ethylene oxide) PEO, poly(propylene oxide) PPO, poly(bis-ω-methoxy-oligooxyethylene-phosphazene) $ME_nP$) or polyamines (PEI). These materials have, in a determined range of temperature and salt concentration, an ionic conduction which can be employed for the production of electrochemical systems, in particular storage batteries (European Patent No. 13,199).

The ionic conductivity of these complexes depends on the degree of dissociation of the salt $MX_n$ and the highest values for a given species M are obtained with anions $X^-$ in which the negative charge is delocalized and which do not have any complexing character. However, the mobility of the cations $M^{n+}$ in this macromolecular medium depends on the rate of exchange in the ligands incorporated in the macromolecular framework in the form of solvating units around these cations. In the case of $n > 1$ and/or in the case of the transition elements, these kinetics are slow and generally entail low or zero values of the cation transport number in these materials. In particular it is therefore difficult to perform electrochemical reactions involving a reversible contribution of the species $M^{n+}$ to the electrode (metal deposition-dissolution, insertion, etc).

SUMMARY OF THE INVENTION

The objective of the present invention is to remedy these disadvantages by providing materials of the polymer-salt type in which the transport of the species M is independent of the dissociation of the salt $MX_n$ into anions and $M^{n+}$ cations.

DESCRIPTION OF THE PREFERRED EMBODIMENTS

Figure 1:
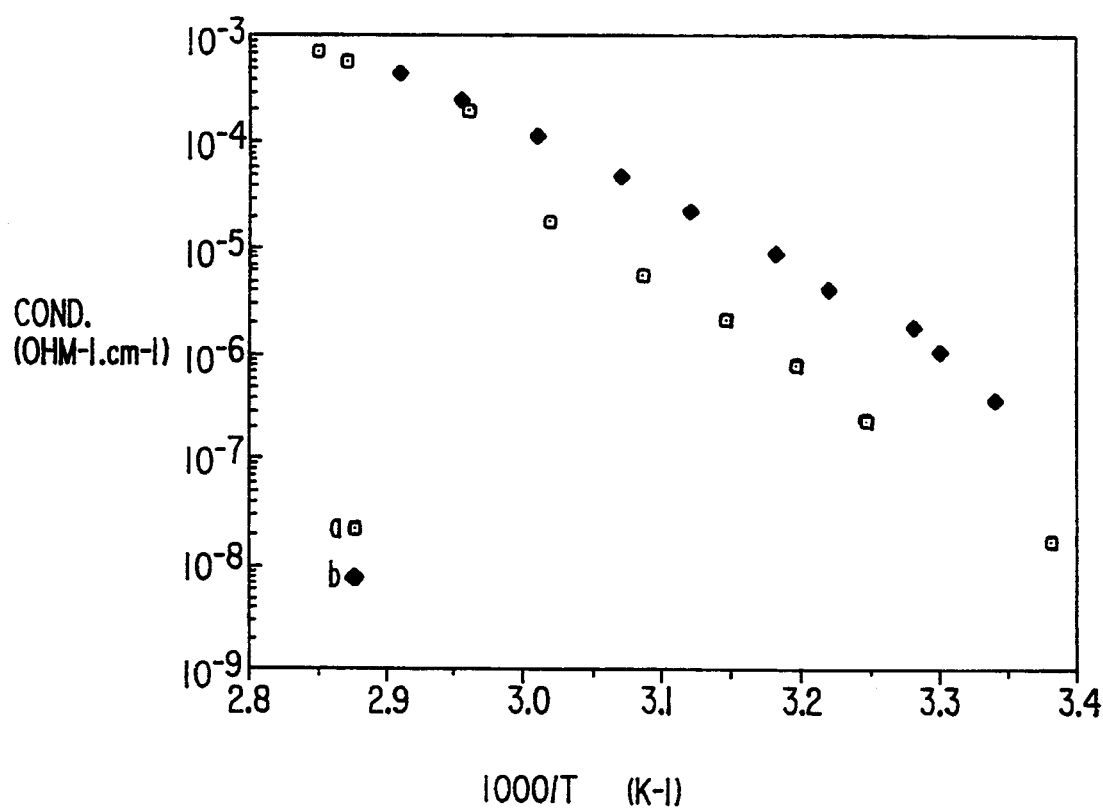
FIGS. 1 and 2 illustrate the variation of ionic conductivity as a function of temperature for Examples 1 and 2, respectively, of the present invention.

The ionically conductive materials of the present invention, comprising a solid solution of one or more salts in a polymer, are characterized in that the transport and the mobility of a metal cation $M^{n+}$ which has the valency n, $1 \leq n \leq 5$, are provided by at least one complex anion corresponding to the general formula $[MZ_nY_p]^{p-}$ formed between an anionic ligand $Z^-$, an anionic ligand $Y^-$ and the cation $M^{n+}$, with $1 \leq p \leq 3$.

Among the ionically conductive materials of the present invention there may be mentioned the polymeric complexes denoted by the overall formula

Poly(s.u.)$_u$ A($M_xZ_zY_y$)

in which

A is a cation of valency p capable of being easily solvated by the polymer, with p=1, 2 or 3

(s.u.) denotes the solvation unit of the polymer u denotes the number of solvation units carried by the polymeric framework providing the solvation of a cation A.

x, y and z are such that the relationship $z+y-nx=p$ is satisfied and that they permit the coexistence, in finite quantities, of the complex anion $[MZ_nY_p]^{p-}$ and of a species chosen from the group consisting of the anion $Z^-$, the anion $Y^-$, the complex anion $[MZ_nY_{p+1}]^{(p+1)-}$, and the neutral species $MZ_n$.

The transport of the species $M^{n+}$ is therefore provided by diffusion of the anionic complex $[MZ_nY_p]^{p-}$ to the electrode. At the electrode, the complex loses some metal M, which deposits on the electrode. In parallel, the complex anion is re-formed from $MZ_n$ or its charge is increased or the ligand $Y^-$ and/or the ligand $Z^-$ are liberated by desolvation of the complex anions. The complex anion which has an increased charge or $Y^-$ or $Z^-$ migrate towards the opposite electrode. The phenomenon reverses if the direction of the current is reversed.

The relatively high mobility of the ionic species in the solvating polymers makes it possible to ensure fast kinetics in the case of the abovementioned mechanism.

The cation A which is capable of being easily solvated by the polymer can be chosen from alkali metals, alkaline-earth metals, lanthanum, quaternary ammonium radicals, amidinium radicals and guanidinium radicals. Among the quaternary ammonium groups there may be mentioned those corresponding to the formula $NH_{(4-j)}R_j^+$. Among the amidinium groups there may be mentioned those corresponding to the formula $RC(NH_{2-j}R_j)_2^+$. Among the guanidinium groups there may be mentioned those corresponding to the formula $C(NH_{2-j}R_j)_3^+$. In all cases R may be hydrogen or an alkyl, oxaalkyl or aryl group, and j may assume the integral values 0, 1 or 2. The preferred cations A of the invention are those which, because of their high ionic radius, provide the best ionic dissociation of the complexes and in the case of which the ligand $Z^-$ does not have any complexing power. The ions $K^+$, $Cs^+$, $Sr^+$, $Ba^{++}$ and $NH_4^+$ are particularly preferred in this respect.

M may be chosen from metals whose valency n is from 1 to 5. Examples which may be mentioned are alkali metals and alkaline-earth metals which have a sufficiently small ionic radius to be capable of being easily complexed, transition metals and rare earths. Li, Mg, Ca, Sr, Mn, Fe, Ni, Co, Cu(I, II) Ag, Zn, Cd, Al, Sn(II, IV), Bi, Hg, Pb, Y and La are very particularly preferred.

$Z^-$ and $Y^-$, which are identical or different, may be chosen from:

halogens such as $F^-$, $Cl^-$, $Br^-$, $I^-$;
pseudohalogens corresponding to the formula $Qs^-$;
the radicals $R_FCO_2^-$, $(R_FCO)_2N^-$, $(R_FCO)_2CQ^-$, $R_FCOCQ_2^-$, $QCOC(CN)_2^-$, $(R_FCO)_2CSO_2RF_F^-$, $(R_FCO)_2CSO_2NR_2^-$, and $R-(OCH_2CH_2)_j-CH_2COC(CN)_2^-$;
sulfonamides such as $QN(SO_2R_F)^-$;

Q denoting CN, R, RCO, $R_2NCO$, $R_2NCS$, $R_F$, $R_FCO$ or a heterocyclic ring, $R_F$ denoting a perhaloalkyl or perhaloaryl radical and R denoting an alkyl, oxaalkyl or aryl group.

Z and Y may also denote, simultaneously or otherwise, a biradical or more generally a multiradical, for example —$(R_FSO_2)NQ'N(SO_2R_F)^-$, Q' denoting a divalent radical which has functionalities similar to those of Q and $R_F$ which have the meaning given above.

The polymers which may be employed for the material of the present invention are those which comprise, on the polymeric framework, solvation units which contain at least one heteroatom such as O, N, F or S.

Among these polymers there may be mentioned those in which the solvation unit of the polymeric framework is an ether group or an amine group. When the solvation units are ether groups the polymeric framework may consist of a homopolymer, a block copolymer, a random copolymer, an alternating copolymer or an ethylene oxide copolymer with a comb structure. When a homopolymer is involved, the polymeric framework advantageously consists of poly(ethylene oxide). Among the copolymers there may be mentioned a copolymer of ethylene oxide with a cyclic ether chosen from propylene oxide, methyl glycidyl ether, allyl glycidyl ether and dioxolane.

Another class of interesting polymers consists of those in which the polymeric framework consists of a poly[alkoxy-(oligoethyleneoxy)phosphazene], of a poly[alkoxyoligo-ethyleneoxy)siloxane] or of a poly[alkoxy(oligoethylene-oxy) vinyl ether].

The materials according to the invention are prepared by dissolving a salt $AY_p$ and a salt $MZ_n$ in a solvating polymer, the respective proportions of the constituents of the mixture being such that the relationship $z+y-nx=p$ is satisfied and that they permit the coexistence of finite quantities of the complex anion $[MZ_nY_p]^{p-}$ and of a species chosen from the group consisting of the anion $Z^-$, the anion $Y^-$, the complex anion $[MZ_nY_{p+1}]^{(p+1)-}$ and the neutral species $MZ_n$.

The dissolving of the salt in the polymer may be performed by dissolving the salts and the polymer in a common liquid solvent and then evaporating the said solvent. Depending on the constituents employed, either a film-forming plastic or a viscous substance is obtained.

The polymer may be crosslinked. If a precrosslinked polymer is employed, the ionic compound is dissolved in a solvent, the precrosslinked polymer is impregnated with the solution obtained and the solvent is then removed. The polymer may also be crosslinked in situ. The crosslinking of the polymeric framework may be performed, for example, by the action of a source of free radicals, of ionizing radiation or of an acid within the Lewis definition. The polymeric framework may also be crosslinked by polycondensation of a di- or trifunctional oligo(ethylene oxide) in which the ends are alcohol or amine functional groups, with an isocyanate of a functionality equal to at least 2.

The dissolving of the salts may also be performed by dry blending of the polymer and the salts in powder form, for example in a pebble mill. Pressing the ground mixture enables the material to be obtained in film form.

Various additives conventionally employed in the case of ionically conductive materials may be added to the mixture to modify the properties of the final material. Thus, the polymeric framework may have incorporated into it a plasticizing agent such as ethylene carbonate, propylene carbonate, γ-butyrolactone, dimethylformamide, N-methylpyrrolidone, tetraalkylsulfamides, polyethylene glycols with a mass of between 200 and 2000 or their methyl ethers and, in general, derivatives of polar molecules of low volatility. The proportion of these additives may range from 1 to 90% of the total mass.

One or more salts of an anion which cannot form a ligand of the cation M may also be added, for example to increase the conductivity of the material or to increase its amorphous character. Among these salts there may be mentioned the salts AX, A having the meaning given above and X being a delocalized anion such as perchlorate, trifluoromethanesulfonate and bistrifluoromethanesulfonylimidide.

Obtaining the material according to the invention in film form is particularly advantageous for some applications. The materials of the present invention can be employed for electrochemical generators. Such generators comprise a "source" negative electrode of the metal M at a high chemical potential, a positive electrode or "well" establishing a low chemical potential of M, the two electrodes being in contact through the intermediacy of a polymeric electrolyte consisting of a material according to the invention. At least one of the electrodes advantageously has a composite structure including the electrochemically active material, an electronically conductive material and the material according to the present invention.

The electronically conductive material may be graphite or a carbon black, particularly acetylene black. The negative electrode preferably consists of metallic zinc, of metallic magnesium, of metallic lithium or one of its alloys, of calcium or of aluminum.

The materials of the present invention may also be employed for an electrochemical system making it possible to affect the transmission of light. Such a system comprises a counterelectrode, an electrolyte consisting of a material according to the invention and a transparent electrode. This electrode can be used as a substrate for the electrochemical deposition of M or as a support for an electrochromic layer. In such a system the counterelectrode is formed by a grid of the metal M, optionally deposited on a transparent support. It may also consist of an electroactive material deposited on a transparent support, the electroactive material being chosen from those which do not undergo a color change in the electrochemical reaction, or from those which exhibit a change in colors accompanying that of the transparent electrode. The metal M is advantageously chosen from copper, zinc, nickel, tin and lead.

The materials of the present invention are described in greater detail in the following examples, which are given by way of illustration without any limitation being implied.

EXAMPLE 1

792 mg of poly(ethylene oxide) PEO with a mass of $5 \times 10^6$ g/mole, 166 mg of potassium iodide and 19 mg of copper iodide are dissolved with stirring in 30 ml of acetonitrile. The homogeneous solution obtained is poured into a glass ring 5 cm in diameter, placed on a PTFE plate. After evaporation of the solvent, a yellow-colored elastic film approximately 25 μm in thickness obtained. The variation of the ionic conductivity of this material as a function of temperature is shown in FIG. 1, during a temperature increase (curve a) and during cooling (curve b).

EXAMPLE 2

Figure 2:
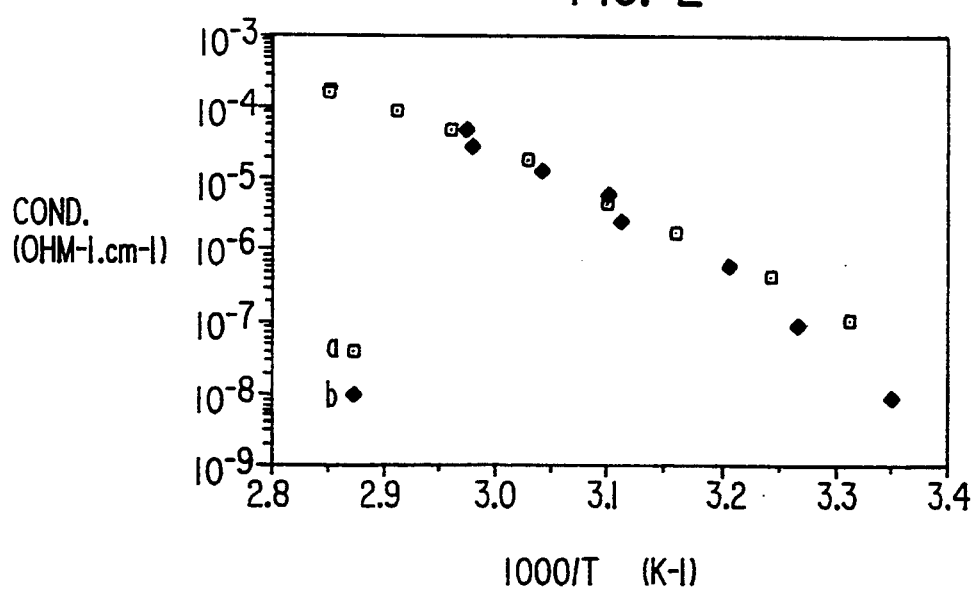

3.96 g of poly(ethylene oxide) PEO with a mass of $9 \times 10^5$ g/mole, 745 mg of potassium chloride and 1.09 g of zinc chloride are dissolved with stirring in 25 ml of methyl formate. The homogeneous solution obtained, which contains the complex anions $ZnCl_3^-$ and $ZnCl_4^{2-}$, is spread on a polypropylene plate with the aid of a template. After evaporation of the solvent, a transparent elastic film of approximately 100 82 m in thickness is obtained. The variation in the ionic conductivity of this material as a function of the temperature is shown in FIG. 2 during cooling (curve a) and during a temperature increase (curve b).

EXAMPLE 3

2.83 g of poly(methoxy-ethoxy-ethoxyphosphazene prepared by the method described by H. R. Allcock, P. E. Austin, T. X. Neenan, J. T. Sisko, P. M. Blonsky & D. F. Shriver, Macromolecules 19, 1508 (1986), 382 mg of guanidinium chloride and 272 mg of zinc chloride are dissolved with stirring in 20 ml of acetone. The homogeneous solution obtained is evaporated. A very viscous transparent material is obtained. The conductivity, measured at 22° C., is higher than $5 \times 10^{-5}$ $(\Omega$ cm$)^{-1}$.

EXAMPLE 4

2.1 g of polyethylene glycol 400-co-oxymethylene with a mass of $\simeq 10^5$ g/mole were prepared by the method described in C. V. Nicholas, D. J. Wilson, C. Booth & R. J. M. Giles, Brit. Polym. J. 20 289 (1988). 760 mg of potassium trifluoroacetate and 1.16 g of zinc trifluoroacetate are dissolved with stirring in 20 ml of acetonitrile. The homogeneous solution obtained, which contains the ions $CF_3CO_2^-$ and $[(CF_3CO_2)_3Zn]^-$, is evaporated under the conditions of Example 1. A very adhesive transparent film is obtained. The conductivity, measured at 22° C., is higher than $7 \times 10^{-5}$ $(\Omega$ cm$)^{-1}$.

EXAMPLE 5

5.28 g of poly(ethylene oxide) PEO with a mass of $5 \times 10^6$ g/mole, 1.03 g of sodium bromide and 1.33 g of anhydrous aluminum bromide are mixed dry in a zirconia pebble mill. The powder obtained is pressed at 80° C. at 400 bars in a leakproof mold. A semicrystalline white film approximately 50 $\mu$m in thickness is obtained, which is stored in a glove box under dry atmosphere (<1 vpm).

EXAMPLE 6

4 g of poly(ethylene oxide) PEO-triol with a mass of 3080 g/mole from the company Daiichi Kogyo Seiyaku Co, 372 mg of potassium chloride and 552 mg of anhydrous cobalt chloride are mixed with 4 ml of acetonitrile. After dissolving, 327 mg of hexamethylene diisocyanate and a drop of dibutyltin dilaurate (catalyst) are added. The blue solution obtained is cast in a mold made up of two polypropylene plates 0.8 mm apart, and of a seal on 3 sides. After 72 hours the polymeric network obtained by the polycondensation reaction is demolded and the acetonitrile is evaporated off in a stream of dry nitrogen. An elastic membrane is obtained, which has very good mechanical properties and whose conductivity is $3 \times 10^{-5}$ $(\Omega$ cm$)^{-1}$ at 50° C., in which the ions $CoCl_3^-$ and $CoCl_4^{2-}$ coexist.

EXAMPLE 7

The cesium salt of bis(trifluoroacetyl)imide is prepared by reaction of $(CF_3CO)_2NH$ with an excess of cesium carbonate in acetonitrile. After evaporation, the salt is extracted with methyl formate and crystallized. 423 mg of anhydrous lithium chloride are added to 5.11 g of the cesium salt in solution in 20 ml of tetrahydrofuran; a precipitate of CsCl is formed and is separated off by centrifuging. 10 ml of the supernatant solution are added to 6.6 g of a terpolymer of ethylene oxide (80%), of methyl glycidyl ether (15%) and of allyl glycidyl ether (5%) with a mass of $\overline{M_w} \simeq 2.5 \times 10^5$ in solution in acetonitrile. 1% by weight of benzoyl peroxide, relative to the polymer, is added to the solution. A film of polymer-salt complex, which contains a mixture of $(CF_3CO)_2N^-$ and $[(CF_3CO)_2N_2Li]^-$, is spread with the aid of a template to correspond to a thickness of 40 $\mu$m after evaporation of the solvent. The dry film is heated to 80° C. for 3 h under a dry argon atmosphere. A crosslinking of the polymer chains via the double bonds of the allyl group takes place, initiated by the peroxide. The film obtained has excellent mechanical properties and its conductivity is $7 \times 10^{-5}$ $(\Omega$ cm$^{-1}$ at 26° C.

EXAMPLE 8

484 mg of poly(ethylene oxide) PEO with a mass of $5 \times 10^6$ g/mole, 246 mg of cesium trifluoroacetate and 71 mg of nickel trifluoroacetate are dissolved with stirring in 15 ml of acetonitrile. The formation of the complex $Ni(CF_3CO_2)_3^-$ is revealed by its intense green color. The homogeneous solution obtained is poured into a glass ring 4 cm in diameter placed on a PTFE plate. After evaporation of the solvent, an elastic film approximately 25 $\mu$m in thickness is obtained.

EXAMPLE 9

1.4 g of poly(methoxy-ethoxy-ethoxy)phosphazene prepared by the method described by H. R. Allcock, P. E. Austin, T. X. Neenan, J. T. Sisko, P. M. Blonsky & D. F. Shriver, Macromolecules 19, 1508 (1986), 378 mg of anhydrous tin chloride and 168 mg of cesium bromide are dissolved with stirring in 20 ml of methyl formate. The homogeneous solution obtained is evaporated. A very viscous transparent material is obtained, which contains the anion $SnCl_2Br^-$ and the neutral salt $SnCl_2$ solvated by the polymer.

The conductivity, measured at 22° C., is higher than $5 \times 10^{-5}$ $(\Omega$ cm$)^{-1}$.

EXAMPLE 10

900 mg of copolymer of Example 7, 152 mg of potassium trifluoroacetate, 125 mg of magnesium trifluoroacetate and 20 mg of azobis(cyanovaleric) acid are dissolved in 10 ml of acetonitrile. Evaporation of the solution in a glass ring on PTFE and heating to 80° C. under argon produce an elastic film whose conductivity is $5 \times 10^{-4}$ $(\Omega$ cm$)^{-1}$ at 55° C. The salts $K^+ CF_3CO_2^-$ and $K^+[(CF_3CO_2)_3Mg]^-$ coexist in this material.

EXAMPLE 11

440 mg of poly(ethylene oxide) PEO with a mass of $5 \times 10^6$ g/mole, 660 mg of magnesium bis(trifluoroacetylimidide) and 152 mg of cesium fluoride are dissolved with stirring in 15 ml of acetonitrile. This composition corresponds to the coexistence of the complexes $\{Mg[(CF_3CO)_2N]_2\}_2F^-$ and $Mg[(CF_3CO)_2N]_2F^-$. The homogeneous solution obtained is poured into a glass ring 4 cm in diameter placed on a PTFE plate. After evaporation of the solvent, an elastic film approximately 25 $\mu$m in thickness is obtained.

EXAMPLE 12

The compound CH$_3$OCH$_2$CH$_2$NH(SO$_2$CF$_3$) is prepared by reaction of trifluoromethanesulfonylimidazole with methoxyethylamine. The compound is distilled at reduced pressure after acidification with hydrochloric acid. To 1.2 g of this compound are added 2 ml of a 0.5M solution of magnesium methyl carbonate in methanol and 277 mg of potassium carbonate. The resulting solution is filtered and evaporated. 342 mg of complex and 396 mg of poly(ethylene oxide) with a mass of $\overline{M_w} \simeq 5 \times 10^6$ are dissolved in 20 ml of acetonitrile. The homogeneous mixture is poured into a glass ring placed on a polished PTFE plate. After evaporation, a film 55 μm in thickness is obtained, whose conductivity at 60° C. is $4 \times 10^{-4}$ (Ω cm)$^{-1}$.

EXAMPLE 13

2-Methoxytetrafluoropropionic acid is prepared by the method described in J. Org. Chem 31 2312, (1966) from hexafluoropropene oxide. 5.25 g of this acid are treated with 3.5 g of potassium hydrogencarbonate in 10 ml of water. After reaction, the water is evaporated off at reduced pressure and the solid residue is extracted with 20 ml of methyl formate. After evaporation of the organic solution, the salt K[CH$_3$OCF(CF$_3$)CO$_2$] is obtained. 4.26 g of this salt are dissolved in 15 ml of acetonitrile and 300 mg of anhydrous magnesium chloride are added. The precipitate of KCl is removed by centrifuging and the supernatant solution is mixed with 15 g of poly(ethylene oxide) with a mass of $9 \times 10^5$ g/mole in 200 ml of acetonitrile. The solution is degassed and cast on a glass plate. After evaporation and drying, a film 70 μm in thickness is obtained, whose conductivity at 80° C. is $2 \times 10^{-3}$ (Ω cm)$^{-1}$.

EXAMPLE 14

Trifluoroacetyltetronic Acid

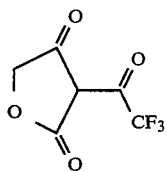

is prepared by condensing trifluoroacetyl chloride with the potassium salt of tetronic acid in the presence of pyridine. 105 mg of anhydrous lithium chloride are added to 2.24 g of the potassium salt of trifluoroacetyltetrolic acid in 20 ml of acetonitrile. The precipitate of potassium chloride is separated off and the supernatant solution is then mixed with 3.3 g of polyethylene glycol 400-co-oxymethylene with a mass $\simeq 10^5$ g/mole in 30 ml of tetrahydrofuran. The polymer has been prepared by the method described in C. V. Nicholas, D. J. Wilson, C. Booth & R. J. M. Giles Brit. Polym. J. 20 289 (1988). The solution is degassed and cast on a glass plate. After evaporation and drying, a film 95 μm in thickness is obtained, whose conductivity at 68° C. is $9 \times 10^{-4}$ (Ω cm)$^{-1}$.

EXAMPLE 15

The operating procedure of Example 14 was reproduced with trifluoroacetyltetronic acid replaced successively by each of the following acids:

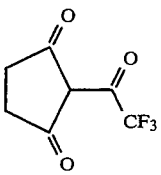

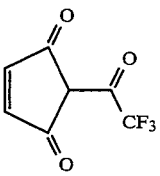

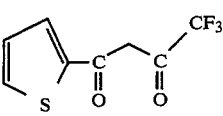

The conductivity of the films obtained was higher than $10^{-4}$ (Ω cm)$^{-1}$ at 70° C.

EXAMPLE 16

The salt K$^+$CH$_3$—OCH$_2$COC(CN)$_2^-$ is prepared by the action of methoxyacetyl chloride on the potassium derivative of malononitrile K$^+$HC(CN)$_2$ in pyridine, and then treatment with potassium carbonate. 430 mg of anhydrous europium chloride are added to 1.76 g of this salt in 10 ml of acetonitrile. The precipitate of KCl is removed by centrifuging and 2.2 g of a random ethylene oxide (80%) - methyl glycidyl ether (20%) copolymer are added. Under the conditions of Example 1, after evaporation, a polymeric electrolyte film is obtained, containing the rare-earth metal in the form of anionic complex EuZ$_3^-$ with Z=CH$_3$—OCH$_2$COC(CN)$_2$.

EXAMPLE 17

A secondary electrochemical generator comprises a negative electrode consisting of a sheet of zinc 20 μm in thickness, cut in the shape of a disc 3 cm in diameter, an electrolyte consisting of the polymeric material according to Example 2, and a positive electrode which has a composite structure obtained by evaporation of a suspension containing 580 mg of the electrolyte material, 965 mg of polydimercaptothiadiazole of formula:

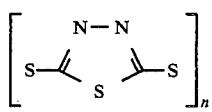

and 150 mg of acetylene black. The whole forms a film 125 μm in thickness on a polypropylene collector (12 μm) metalized with a layer of molybdenum of approximately 200 nm. The whole is cut to the same diameter. The three components are pressed together at 90° C. at $2 \times 10^5$ Pa. At 70° C. the e.m.f. of the battery thus formed is 1.15 volts and its capacity at 50 μA/cm$^2$ as far as the cutoff voltage of 0.8 V is 8C/cm$^2$. This generator is rechargeable.

EXAMPLE 18

A secondary generator is manufactured with the following electrochemical system:

| Mg | electrolyte:material according to the invention with M = Mg | composite/graphite fluoride — electrolyte — acetylene black |

The electrolyte is that described in Example 11. The composition of the positive electrode corresponds to 42% v/v of electrolyte, 8% v/v of acetylene black and 50% v/v of graphite fluoride $CF_x(x\simeq 1)$. The composite material diluted in acetonitrile is spread on an 8-$\mu$m copper sheet so as to form a layer approximately 80 $\mu$m in thickness. The negative electrode is a 20-$\mu$m sheet. The battery voltage after assembly by laminating the components at 80° C. is 2.5V and the capacity at a rate of 300 $\mu$A/cm$^2$ is 7 mAh/cm$^2$.

EXAMPLE 19

An electrochemical generator comprises a negative electrode consisting of a sheet of lithium 25 $\mu$m in thickness, an electrolyte prepared according to Example 7 and a composite electrode in which the active material is vanadium oxide $V_2O_5$ (55% v/v), acetylene black (6% v/v) and some of the same electrolyte. The thickness of the positive electrode is 45 $\mu$m. The capacity is 8 coulombs/cm$^2$ with a cutoff voltage of 2.2 volts.

EXAMPLE 20

A variable transmission window glazing device is constructed as follows: a layer of the polymeric electrolyte described in Example 1 is deposited on a glass plate covered with a layer of doped indiumoxide (ITO) so as to obtain a resistance of 10 $\Omega$ square. The counterelectrode consists of a 1 $\mu$m deposit of metallic copper on another glass plate of similar size. The continuous layer is converted by photoetching into a grid with square meshes with a 15-$\mu$m side and 2 $\mu$m in thickness. The assembly takes place under vacuum at 80° C. with the application of a mechanical force of $4.9\times 10^5$ Pa (5 kg/cm$^2$). When a voltage of 1 volt is applied between the metal grid and the ITO (−pole) layer, a reflective copper deposit is seen to appear. When the polarities are reversed the transparency of the system is reestablished in a few seconds.

EXAMPLE 21

A flexible device with electrically controlled optical transmission is constructed as follows: a layer of the polymeric electrolyte described in Example 9 is deposited on a poly(ethylene terephthalate) (PET) film coated by cathodic sputtering with a layer of fluorine-doped tin oxide ($SnO_2$/F) so as to obtain a resistance of 50 $\Omega$ square. The counterelectrode consists of a 1-$\mu$m deposit of metallic tin on a PET film. The continuous layer is converted by photoetching into a grid with square meshes with a 15-$\mu$m side and 2 $\mu$m in thickness. The assembly takes place under vacuum at 80° C. by lamination of the components. When a voltage of 0.8 volt is applied between the metal grid and the ITO layer (−pole), a reflective tin deposit is seen to appear. When the polarities are reversed the transparency of the system is reestablished in $\simeq 1$ minute.

We claim:

1. Ionically conductive material comprising a solid solution of one or more salts in a polymer, characterized in that the polymer has a framework wherein the solvating units contain at least one heteroatom selected from the group consisting of O, N, F, and S, and that the transport and the mobility of a metal cation $M^{n+}$ which has the valency n are provided by at least one complex anion corresponding to the general formula $(MZ_nY_p)^{p-}$, wherein M is the same metal in $M^{n+}$, formed between an anionic ligand $Z^-$, an anionic ligand $Y^-$ and the cation $M^{n+}$, and wherein $1\leq n\leq 5$, and $1\leq p\leq 3$.

2. Material according to claim 1, characterized in that the solid solution is a polymeric complex denoted by the overall formula $$\text{Poly(s.u.)}_u A(M_x Z_z Y_y)$$

in which

A is a cation of valency p, with p=1 or 2;

(s.u.) denotes the solvation unit of the polymer;

u denotes the number of solvation units carried by the macromolecular framework which are needed for solvating a cation A;

x, y and z are such that the relationship $z+y-nx=p$ is satisfied and that they permit the coexistence, in finite quantities, of the complex anion $(MZ_nY_p)^{p-}$ and of a species chosen from the group consisting of the anion $Z^-$, the anion $Y^-$, the complex anion $(MZ_nY_{p+1})^{p+1}$, the complex anion $(MZ_{n+1}Y_p)^{p+1}$ and the neutral species $MZ_n$.

3. Material according to claim 2, characterized in that the cation A is chosen from alkali metals, alkaline-earth metals, quaternary ammonium radicals corresponding to the formula $NH_{(4-j)}R_j^+$, amidinium radicals corresponding to the formula $RC(NH_{2-j}R_j)_2^+$, guanidinium radicals corresponding to the formula $C(NH_{2-j}R_j)_3^+$, with j=0, 1 or 2, R being chosen from hydrogen and an alkyl, oxaalkyl or aryl group.

4. Material according to claim 1, characterized in that the cation $M^{n+}$ is a cation derived from an element chosen from Li, Mg, Ca, St, Mn, Fe, Ni, Co, Cu(I), Cu(II), Ag, Zn, Cd, Al, Sn(II), Sn(IV), Bi, Hg, Pb, Y and the rare earths.

5. Material according to claim 1, characterized in that $Z^-$ and $Y^-$, which are identical or different, are chosen from:

$F^-$, $Cl^-$, $Br^-$, $I^-$;

pseudohalogens corresponding to the formula $Qs^-$;

the radicals $R_FCO_2^-$, $(R_FCO)_2N^-$, $(R_FCO)_2CQ^-$, $R_FCOCQ_2^-$, $QCOC(CN)_2^-$, $(R_FCO)_2CSO_2R_F^-$, $(R_FCO)_2CSO_2NR_2^-$, $R-(OCH_2CH_2)_j-CH_2COC(CN)_2^-$;

sulfonamides $QN(SO_2R_F)^-$;

Q denoting CN, R, RCO, $R_2NCO$, $R_2NCS$, $R_F$, $R_FCO$ or a heterocyclic ring, $R_F$ denoting a perhaloalkyl or perhaloaryl radical, R denoting an alkyl, oxaalkyl or aryl radical.

6. Materials according to claim 1, characterized in that Z and Y denote a multiradical, simultaneously or otherwise.

7. Material according to claim 6, characterized in that the multiradical is a biradical denoted by the formula $-(R_FSO_2)NQ'N(SO_2R_F)^-$, in which Q' denotes a bivalent radical carrying at least one functional group chosen from CN, R, RCO, $R_2NCO$, $R_2NCS$, $R_F$, $R_FCO$ or a heterocyclic ring, $R_F$ denoting a perhaloalkyl or perhaloaryl radical, R denoting an alkyl, oxaalkyl or aryl radical.

8. Material according to claim 1, characterized in that the solvation unit of the polymeric framework is an ether group or an amine group.

9. Material according to claim 8, characterized in that the polymeric framework consists of a homopolymer, a block copolymer, a random copolymer, an alternating copolymer or an ethylene oxide copolymer with a comb structure.

10. Material according to claim 1, characterized in that it contains additives chosen from salts of anions which cannot form a ligand for the ion $M^{n+}$ and from plasticizing agents.

11. Process for the preparation of a material according to claim 1, characterized in that a salt $AY_p$ and a salt $MZ_n$ are dissolved in a solvating polymer, in proportions such that the relationship $z+y-nx=p$ is satisfied and that they permit the coexistence, in finite quantities, of the complex anion $(MZ_nY_p)^{p-}$ and of a species chosen from the group consisting of the anion $Z^-$, the anion $Y^-$, the complex anion $(MZ_nY_{p+1})^{(p+1)}$ and the neutral species $MZ_n$.

12. Process according to claim 11, characterized in that the salts and the polymer are dissolved in a common liquid solvent which is then evaporated.

13. Process according to claim 12, characterized in that the polymer is crosslinked in situ.

14. Process according to claim 11, characterized in that the polymer is precrosslinked and impregnated with a solution of salt in an organic solvent, this solvent being removed after the impregnation.

15. Process according to claim 11, characterized in that the salts are dissolved in the polymer in dry state by grinding.

16. Electrochemical generator, characterized in that it comprises as electrolyte a material according to claim 1.

17. Generator according to claim 16, characterized in that it comprises a "source" negative electrode of the metal M with a high chemical potential, a positive electrode or "well" establishing a low chemical potential of M, the two electrodes being in contact through the intermediacy of the electrolyte.

18. Electrochemical generator according to claim 16, characterized in that at least one of the electrodes has a composite structure including an electrochemically active material, an electronically conductive material and the material forming the electrolyte.

19. Electrochemical system which makes it possible to affect the transmission of light, comprising a counterelectrode, an electrolyte, and a transparent electrode used as substrate for the electrochemical deposition of the metal M, characterized in that the electrolyte is a material according to claim 1.

20. Electrochemical system according to claim 19, characterized in that the counterelectrode consists of a grid of the metal M, optionally deposited on a transparent support.

* * * * *